(No Model.)
T. NESOM.
EMBOSSING MACHINE.
No. 546,621. Patented Sept. 17, 1895.
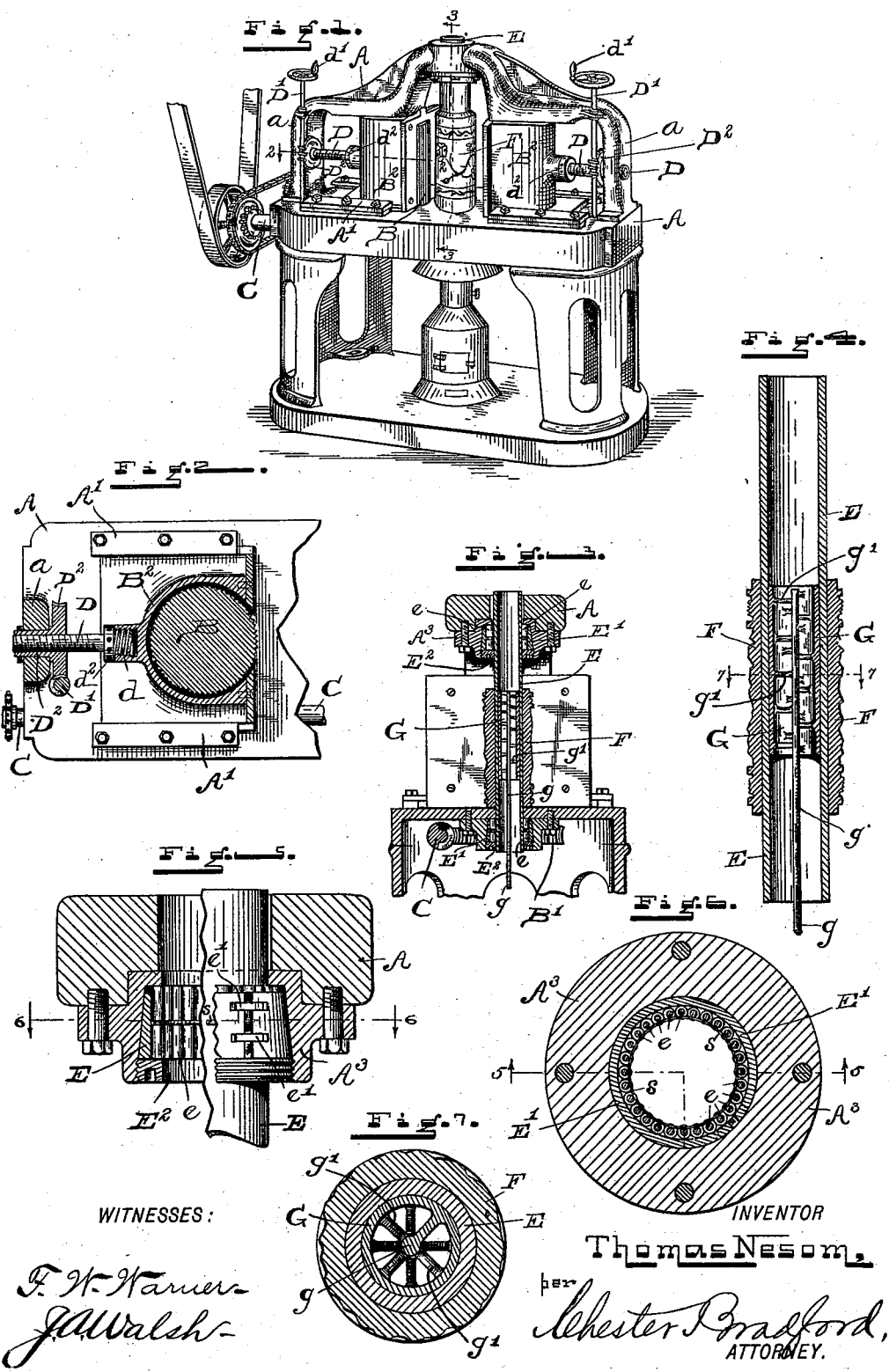
WITNESSES:
INVENTOR
Thomas Nesom,
per Chester Bradford,
ATTORNEY.

United States Patent Office.

THOMAS NESOM, OF INDIANAPOLIS, INDIANA, ASSIGNOR, BY MESNE ASSIGNMENTS, TO THE UNION EMBOSSING MACHINE COMPANY, OF SAME PLACE.

EMBOSSING-MACHINE.

SPECIFICATION forming part of Letters Patent No. 546,621, dated September 17, 1895.

Application filed December 5, 1893. Serial No. 492,880½. (No model.)

*To all whom it may concern:*

Be it known that I, THOMAS NESOM, a citizen of the United States, residing at Indianapolis, in the county of Marion and State of Indiana, have invented certain new and useful Improvements in Embossing-Machines, of which the following is a specification.

My present invention consists in certain improvements upon that shown and described in Letters Patent of the United States No. 483,247, dated September 27, 1892, whereby various advantages are secured, as will be hereinafter more particularly described and claimed.

Referring to the accompanying drawings, which are made a part hereof and on which similar letters of reference indicate similar parts, Figure 1 is a perspective view of a machine embodying my said improvements; Fig. 2, a horizontal sectional view looking downwardly from the dotted line 2 2 in Fig. 1; Fig. 3, a vertical sectional view on the dotted line 3 3 in Fig. 1; Fig. 4, a view similar to a portion of Fig. 3, on an enlarged scale; Fig. 5, a view looking upwardly from the dotted line 5 5 in Fig. 6 and similar in part to a portion of Fig. 3, but on an enlarged scale; Fig. 6, a horizontal sectional view looking downwardly from the dotted line 6 6 in Fig. 5; and Fig. 7, a horizontal sectional view, on an enlarged scale, on the dotted line 7 7 in Fig. 4.

In said drawings the portions marked A represent the framework of the machine; B, the feed-rollers; C, the shaft by which said feed-rollers are driven; D, the screws by which said feed-rollers are adjusted; E, the combined flue and shaft for the impression-roll; F, said impression-roll, and G a heating-core inside the hollow shaft E and bearing against the interior thereof within the space where the impression-roll is secured upon the exterior.

The frame A and feed-rollers B and shaft C are substantially the same, generally speaking, as the corresponding parts shown in the above-mentioned Letters Patent. They are, however, as will be seen by comparison, somewhat improved in construction.

The feed-rollers are driven from the shaft C through the worm thereon and the screw-gear B' on the shaft of said feed-rolls, as shown in Fig. 3. The feed-rolls are shown as mounted in housings $B^2$, which in turn are mounted in slides A' on the framework. The screws D are connected with said housings and with combined bearings and screw-gears $D^2$, mounted in standards $a$, forming part of the framework A, and are adapted to revolve in the bearings in said standards, in which they are so secured as to prevent longitudinal movement. These parts $D^2$ may be further described as screw-gears, having extended hubs and forming also nuts to operate the screws D. They are operated by worms on vertical shafts D', upon the upper ends of which shafts are handles or hand-wheels $d'$, by which they are turned. This arrangement secures a very accurate and at the same time powerful adjustment of the feed-rollers. In order to save time in the practical operation of this machine, I provide, however, a more speedy means of throwing the feed-rollers back and forth in operation after the desired adjustment has been secured by the means just described. As shown in Fig. 2, on the inner end of the screw-shafts D are formed larger and coarser screws $d$, the threads of which run reversely to the threads of the main screw. A collar $d^2$ with holes in its edge, in which a pin or handle may be inserted, forms the means of operating this device. The rollers are first set up by means of the shafts D and D' and the screw-gear connecting them to the desired adjustment. Then in practical operation as it is desired to quickly throw the feed-rollers back and forth into and out of engagement with the work, a short movement of the coarser screw $d$ by means of the collar $d^2$ and the handle therein is all that is required.

The hollow shaft E serves, as in said former patent, as a combined flue for a furnace and shaft for the embossing-roll. As the machine works under heavy pressure and the heat renders ordinary lubrication impracticable, I have, however, found it desirable to provide a more easily-running bearing. At the same time owing to the necessity for accuracy of work any bearing embodying looseness is incapable of serving my purpose. An important feature of my present invention, therefore, is a newly-devised pin or roller bearing, (illustrated in Figs. 5 and 6,) and which will now be described. This bearing consists of rollers or round pins $e$ laid within a tapered and split adjustable ring E'. The means of adjustment are a screw-follower $E^2$, running in a threaded way underneath said ring and adapted to force it a greater or less distance into the hollow tapered bearing $A^3$ on the framework A, through which the hollow shaft E passes. A split ring would manifestly be impracticable as a support for rollers under heavy pressure unless means were provided to bridge the split. I therefore form slits extending each way from the point of division, into which I insert bridge-pieces $e'$, the surfaces of which are made to exactly correspond with the interior and exterior surfaces of said split ring.

In order to hold the pins in place during the insertion and removal of the hollow shaft, I form a circumferential groove in the center of each, and in the groove thus formed in the surfaces of all of them I lay a small spring-wire $s$, which serves this purpose and does not at all interfere with the rollers, as their surfaces project slightly beyond it. It will be readily seen that after the hollow shaft is inserted in its bearings said bearings can be adjusted with exceeding nicety by turning up the followers $E^2$ and driving the conical rings upward until the rollers just touch the surface of said hollow shaft.

The embossing-roll F has engraved upon its surface the figures desired to be impressed upon the wood. It is mounted on the shaft E, as heretofore.

The furnace, as shown, is beneath or outside of the machine and disconnected therefrom, which is a much more advantageous arrangement than to embody the combustion-chamber in the shaft E, as the fuel is thus not brought into contact with the surface of said shaft.

The core G is placed within and in contact with the surface of the hollow shaft E. Its office is to take up the heat from the products of combustion and communicate it through the hollow shaft more directly to the embossing-roll than would otherwise be possible. To this end I find it of great advantage to form this core of a metal having great heat-conducting power, such as copper or an amalgam of similar properties. It may or may not have the rod $g$, either constructed separately or formed integrally therewith, extending down into the furnace, but I regard it as preferable to employ such rod. Whether or not the rod $g$ is used, I prefer to use cross-bars or arms $g'$, extending inwardly from the sides of the cylinder or shell forming the main portion of the core, but even these are not indispensable. I have found by actual experiment that practically the whole effective heating power is expended upon the embossing-roll when this core is employed, and thus I am enabled to save and utilize a large portion of the heat, which in the former construction went to waste, besides keeping the machine generally from being heated to the extent it formerly was.

Having thus fully described my said invention, what I claim as new, and desire to secure by Letters Patent, is—

1. The combination, with the feeding rolls of an embossing machine, of the housing carrying the same, and screws for moving the housings and feeding rolls toward and from the embossing roll, said screws being provided with ordinary threads and nuts for adjusting, and with a coarser screw-threaded structure at one end for throwing the rolls into and out of operative position quickly, substantially as shown and described.

2. The combination, in an embossing machine, of the feeding rolls B, the housings $B^2$, the screw D having the operating nut or wheel $D^2$, and the coarse-threaded structure $d$ with the collar $d^2$ having holes for a pin or hand-lever whereby to operate it, substantially as set forth.

3. The combination, with the hollow shaft of an embossing machine, of a pin bearing, the pins having central grooves therein, and a spring laid in said grooves, whereby the pins are retained in position during the insertion and removal of the shaft, substantially as set forth.

4. The combination, in an embossing machine, of a furnace located outside the machine, a hollow shaft for the embossing roll connected by a flue or pipe to said furnace, and a core G secured within said shaft in the path of the products of combustion and within the embossing roll mounted on said shaft and adapted to be heated by said products of combustion as they pass from said furnace, whereby the heat is communicated more directly to said embossing roll, substantially as and for the purposes set forth.

5. The combination, with the hollow shaft of an embossing machine forming part of the flue leading from the furnace, of a heating core secured within said shaft in the path of the products of combustion, said heating core being formed of a highly heat conductive metal, substantially as set forth.

6. The combination, in an embossing machine, with the hollow shaft, of a heating core secured within said shaft, and a rod extending from said core down to or toward the furnace, substantially as set forth.

7. The combination, in an embossing machine, with the hollow shaft to the embossing roll which forms also a portion of the flue leading from the furnace, of a heating core secured within said shaft consisting of a cylindrical shell, and arms or cross-bars extending across inside said shell in the path of the products of combustion, and arranged and operating substantially as set forth.

In witness whereof I have hereunto set my hand and seal, at Indianapolis, Indiana, this 25th day of November, A. D. 1893.

THOMAS NESOM. [L. S.]

Witnesses:
CHESTER BRADFORD,
JAMES A. WALSH.